(12) United States Patent (10) Patent No.: US 8,737,551 B1
Agami et al. (45) Date of Patent: May 27, 2014

(54) SYNCHRONIZING RECEIVE DATA OVER A DIGITAL RADIO FREQUENCY (RF) INTERFACE

(71) Applicant: Motorola Mobility LLC, Libertyville, IL (US)

(72) Inventors: Gregory M. Agami, Arlington Heights, IL (US); Michael J. Carney, Libertyville, IL (US); Yun H. Kim, Bartlett, IL (US); Chris T. Quanbeck, Libertyville, IL (US); Ludovic Tancerel, Toulouse (FR)

(73) Assignee: Motorola Mobility LLC, Chicago, IL (US)

( * ) Notice: Subject to any disclaimer, the term of this patent is extended or adjusted under 35 U.S.C. 154(b) by 3 days.

(21) Appl. No.: 13/669,730

(22) Filed: Nov. 6, 2012

(51) Int. Cl.
*H04L 7/00* (2006.01)

(52) U.S. Cl.
USPC .......................................... 375/355; 375/354

(58) Field of Classification Search
USPC .................................. 375/354–355
See application file for complete search history.

(56) References Cited

U.S. PATENT DOCUMENTS

| | | | |
|---|---|---|---|
| 7,522,685 B2 | 4/2009 | Zakrewski | |
| 7,738,491 B2 | 6/2010 | Schuster et al. | |
| 7,948,964 B1 | 5/2011 | Khlat et al. | |
| 2005/0220240 A1* | 10/2005 | Lesso | 375/372 |
| 2008/0287079 A1 | 11/2008 | Matsui et al. | |
| 2009/0061787 A1 | 3/2009 | Koller et al. | |
| 2009/0154446 A1 | 6/2009 | Adler et al. | |
| 2010/0074311 A1 | 3/2010 | Kopmeiners | |
| 2010/0135275 A1 | 6/2010 | Storm et al. | |
| 2011/0019657 A1 | 1/2011 | Zaher | |
| 2012/0224518 A1 | 9/2012 | Padmanabhan et al. | |

FOREIGN PATENT DOCUMENTS

EP   2154788 A2   2/2010

OTHER PUBLICATIONS

Agilent: "DigRF FAQ", Agilent Internet Publication, Jul. 1, 2007, Retrieved from the Internet: URL:http://www.home.agilent.com/upload/cmcupload/A11/DigRF_FAQ_V1.pdf>retrieved on Jan. 14, 2014, all pages.
Fogg A: "DigRF Baseband/RF Digital Interface Specification", Internet Citation, Feb. 20, 2004, Retrieved from the Internet:URL:http://146.101.169.51/DigRGF%20Standard%20v112.pdf. [retrieved on Feb. 20, 2004], all pages.
Patent Cooperation Treaty, International Search Report and Written Opinion of the International Searching Authority for International Application No. PCT/US2013/067394, Jan. 22, 2014, 13 pages.
Chen, Y., et al., "Ultra-Low Power Time Synchronization Using Passive Radio Receivers" IEEE 10th International Conference on Information Processing in Sensor Networks (IPSN), Apr. 12-14, 2011, 11 pages.

* cited by examiner

*Primary Examiner* — Curtis Odom

(57) ABSTRACT

A method and system synchronizes transmission of receive data over an asynchronous digital radio frequency interface in a wireless communication device. A timing accurate strobe (TAS) re-sampler generates, using a first timing strobe synchronized to a baseband modem clock, a second timing strobe synchronized to a radio frequency integrated circuit (RFIC) clock. The TAS re-sampler forwards the second timing strobe to the RFIC to trigger a collection of data samples and initiates a count of RFIC clock cycles. The RFIC sends the data samples to a baseband First In First Out (FIFO) buffer over the asynchronous interface. In response to the count reaching a pre-determined number of RFIC clock cycles corresponding to a fixed delay, the TAS re-sampler triggers a reading of data from the FIFO buffer. The baseband modem receives data corresponding to the collection of data samples after a fixed delay from generation of the first timing strobe.

20 Claims, 6 Drawing Sheets

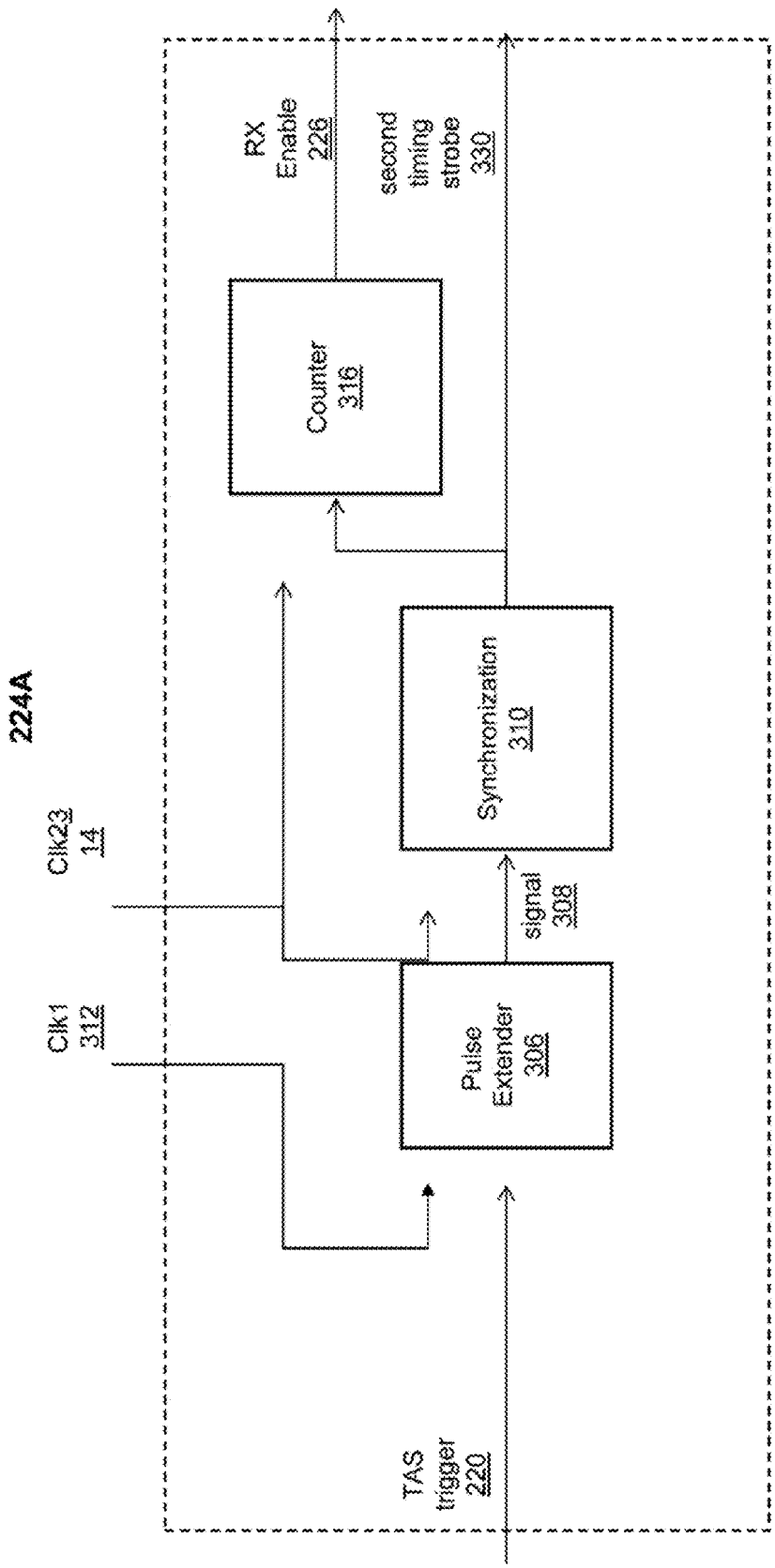

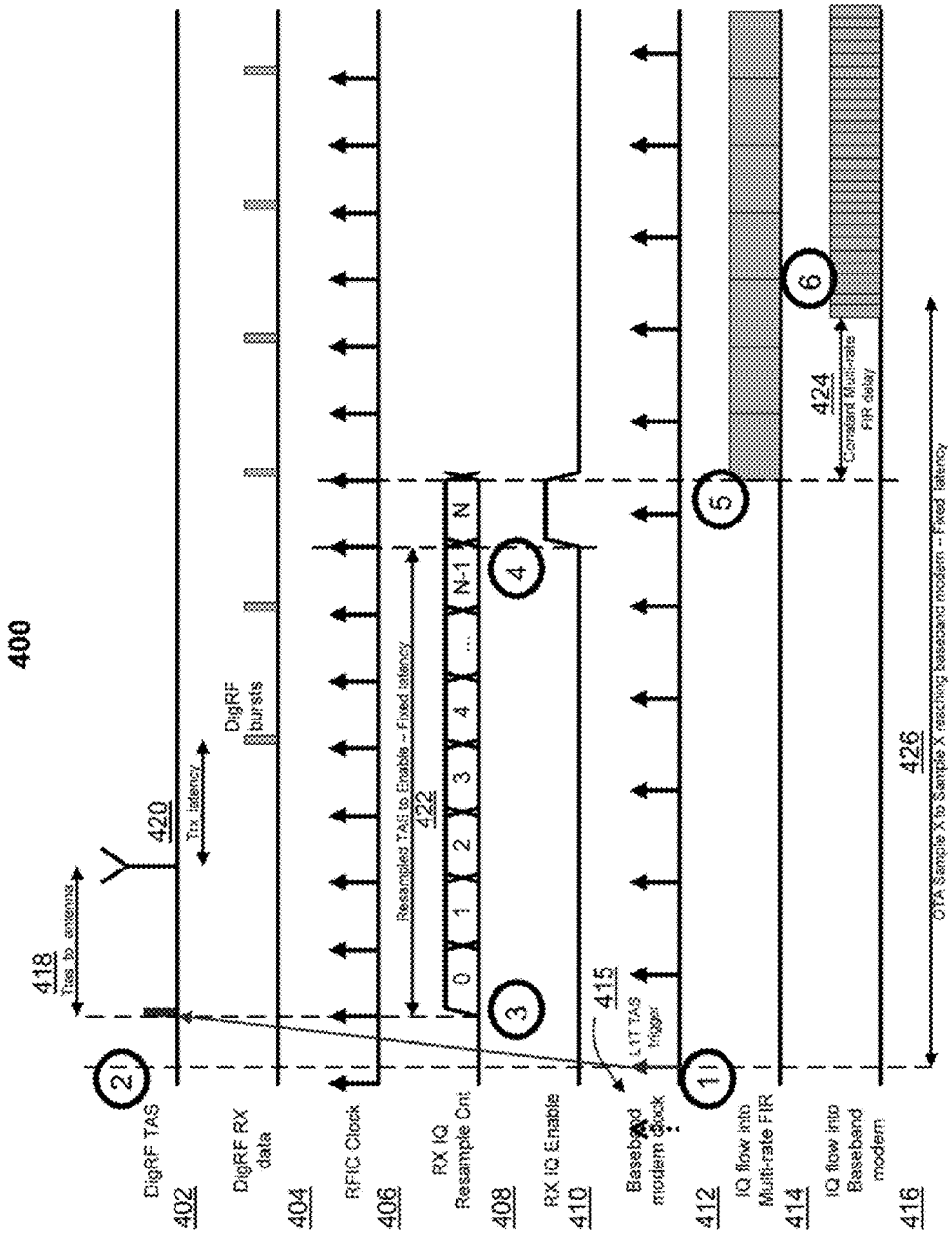

SYNCHRONIZING RECEIVE DATA OVER A DIGITAL RADIO FREQUENCY (RF) INTERFACE

BACKGROUND

1. Technical Field

The present disclosure relates in general to wireless communication devices and in particular to receiver synchronization in wireless communication devices.

2. Description of the Related Art

Many wireless communication devices are capable of operating in different modes using different network communication standards such as Global System for Mobile Communications (GSM), Code Division Multiple Access (CDMA), and Long Term Evolution (LTE). To maximize use of the limited real estate within these devices, the devices are configured to switch operation between communication modes using a same set of transceiver components. However, these devices have a challenge of maintaining receiver synchronization between the baseband modem and a radio frequency integrated circuit (RFIC). This challenge of maintaining synchronization can often be associated with initiating communication operation following a sleep mode or after a power up procedure. Furthermore, in order to use common RF components to reduce power and area requirements, the RFIC sampling rate may differ from a baseband modem sampling rate. A phase locked status associated with modem timing recovery can be lost if a receiver's timing shifts by more than a specific fraction of the cycle period associated with the corresponding receiver sampling rate. For example, phase locked status can be lost if the receiver's timing shifts by more than the one quarter of the baseband cycle period for a number of CDMA based technologies. In addition, wireless communication devices generally use an asynchronous digital radio frequency interface as a standard communication interface between the baseband modem and the RFIC. However, the time interval between an RFIC sampling of an over-the-air signal and an arrival of corresponding data into the baseband First In First Out (FIFO) buffer after transmission over the asynchronous digital radio frequency communication interface is not fixed.

BRIEF DESCRIPTION OF THE DRAWINGS

The described embodiments are to be read in conjunction with the accompanying drawings, wherein:

FIG. 3A is a block diagram illustrating a timing accurate strobe (TAS) re-sampler circuit, according to one embodiment;

FIG. 4 is a timing diagram illustrating relative timing of signals used to provide synchronization for receive data being transmitted over an asynchronous digital RF interface, according to one embodiment.

DETAILED DESCRIPTION

Figure 1:
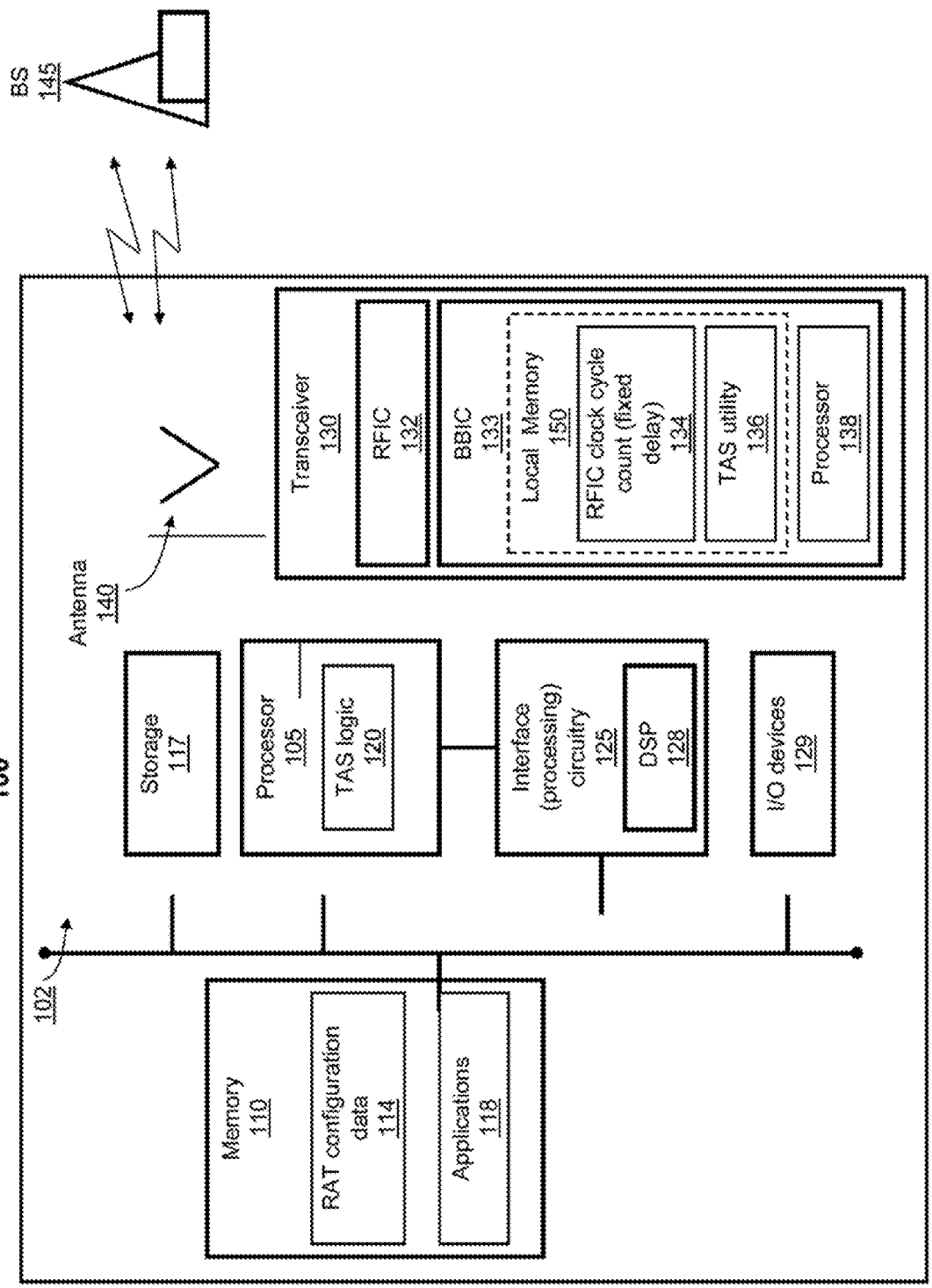
FIG. 1 is a block diagram illustrating an example wireless communication device within which the various features of the described embodiments can be advantageously implemented, according to one embodiment.

The illustrative embodiments provide a method and system for synchronizing transmission of receive data over an asynchronous digital radio frequency (RF) interface in a wireless communication device. Using a first timing strobe synchronized to a baseband modem clock, a timing accurate strobe (TAS) re-sampler generates, a second timing strobe synchronized to a radio frequency integrated circuit (RFIC) clock. The TAS re-sampler forwards the second timing strobe to the RFIC and initiates a clock cycle counter to track RFIC clock cycles. In addition, the TAS re-sampler triggers, using the second timing strobe, the RFIC to perform data sampling to collect receive data samples, which the RFIC sends to a baseband First In First Out (FIFO) buffer over the digital RF interface. In response to the clock cycle counter reaching a pre-determined number of RFIC clock cycles corresponding to a first fixed delay, the TAS re-sampler sends a receive enable signal to the baseband FIFO buffer to enable and trigger a reading of data from the FIFO buffer using the RFIC clock. A multi-rate finite impulse response filter (FIR) receives the data from the FIFO buffer and, following a second fixed delay associated with data filtering at the multi-rate FIR, the baseband modem receives data corresponding to the collected data samples. The baseband modem receives this data after a pre-determined fixed delay from generation of the first timing strobe. The various aspects of the method are described below with reference to the figures and in particular with reference to the flow chart of FIG. 5.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

With specific reference now to FIG. 1, there is depicted a block diagram of an example wireless communication device 100, within which the functional aspects of the described embodiments may advantageously be implemented. Wireless communication device 100 represents a device that is adapted to transmit and receive electromagnetic signals over an air interface via uplink and/or downlink channels between the wireless communication device 100 and communication network equipment (e.g., base-station 145) utilizing a plurality of different communication standards including Global System for Mobile Communications (GSM), Code Division Multiple Access (CDMA), and Long Term Evolution (LTE). In one or more embodiments, the wireless communication device can be a mobile cellular device/phone or smartphone, or laptop, netbook or tablet computing device, or other types of communications devices. Wireless communication device 100 comprises processor 105 and interface circuitry 125, which includes digital signal processor (DSP) 128. Processor 105 and interface circuitry 125 are connected to memory component 110 via signal bus 102. Wireless communication device 100 includes one or more input/output (I/O) devices 129 and also includes transceiver 130 for sending and receiving communication signals. In at least some embodiments, the sending and receiving of communication signals occur wirelessly and are facilitated by one or more antennas 140 coupled to the transceiver 130. The number of antennas can vary from device to device, ranging from a single antenna to two or more antennas, and the presentation within wireless communication device 100 of a single antenna is merely for illustration. Wireless communication device 100 is able to wirelessly communicate to base transceiver system (BTS)/base-station 145 via antenna 140. Transceiver 130 comprises radio frequency integrated circuit (RFIC) 132 and baseband integrated circuit (BBIC) 133 which is described in greater detail in FIG. 2.

In addition to the above described hardware components of wireless communication device 100, various features of the invention may be completed/supported via software (or firmware) code or logic stored within memory 110 (or other storage 117) or local memory 150 and executed by DSP 128, processor 105 or local processor 138 of BBIC 133. Thus, for example, illustrated within memory 110 and/or local memory 150 are a number of software/firmware/logic components/modules, including radio access technology (RAT) configuration data 114, applications 118 and Timing Accurate Strobe (TAS) utility 136. In one embodiment, BBIC 133 comprises a baseband processor, which can be described as a digital signal processor (DSP), and a memory or storage system. According to one aspect of the disclosure, the memory/storage system includes therein firmware, such as a TAS utility, that supports the various processing functions of BBIC 133. In one embodiment, TAS utility 136 is executed on processor 105 to provide TAS logic 120.

The various components within wireless communication device 100 can be electrically and/or communicatively coupled together as illustrated in FIG. 1. As utilized herein, the term "communicatively coupled" means that information signals are transmissible through various interconnections between the components. The interconnections between the components can be direct interconnections that include conductive transmission media, or may be indirect interconnections that include one or more intermediate electrical components. Although certain direct interconnections are illustrated in FIG. 1, it is to be understood that more, fewer or different interconnections may be present in other embodiments.

Figure 2:
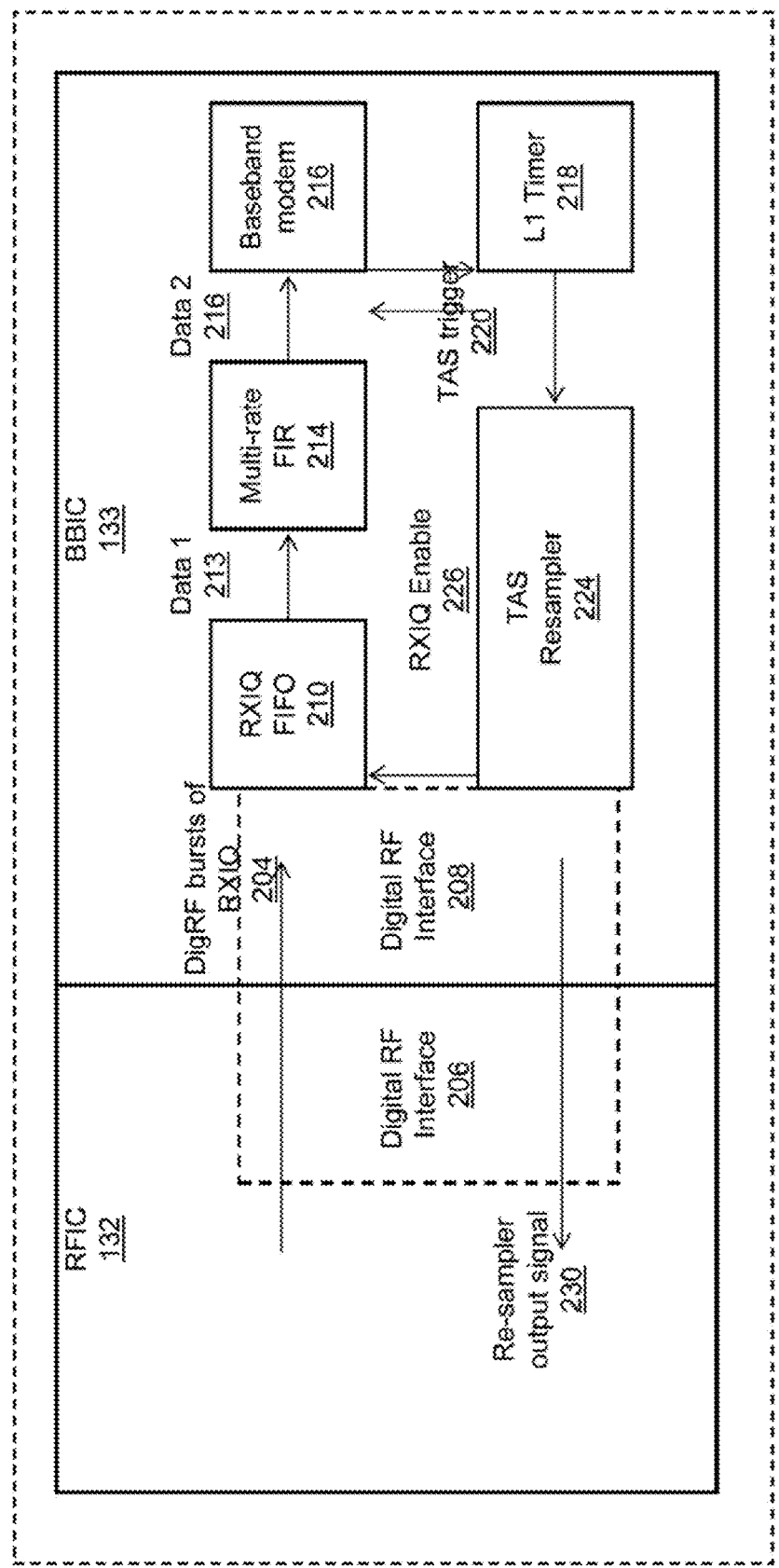
FIG. 2 provides a block diagram representation of a receiver having a baseband integrated circuit (BBIC) and a radio frequency integrated circuit (RFIC), according to one embodiment.

FIG. 2 provides a block diagram representation of a receiver operating within transceiver 130, according to one embodiment. Receiver 200 comprises RFIC 132 and BBIC 133 coupled together by an asynchronous digital radio frequency (RF) interface comprising first asynchronous digital RF interface component (206) within RFIC 132 and second asynchronous digital RF interface component (208) within BBIC 133. BBIC 133 comprises a series of linearly interconnected functional components, including receiver in-phase and quadrature (RXIQ) FIFO 210, multi-rate FIR 214, baseband modem 216, Layer 1 (L1) timer 218, and TAS re-sampler 224. Baseband modem 216 is coupled to an output port of multi-rate FIR 214. Baseband modem 216 is also coupled to a clock generator and/or timer illustrated as L1 timer 218. TAS re-sampler 224 receives from L1 timer 218 a first timing strobe illustrated as TAS trigger 220. RFIC 132 samples data from an antenna (e.g., antenna 140) and forwards the sampled data over the digital RF interface. The sampled data is received as digital RF bursts of RXIQ data 204 by RXIQ First In First Out (FIFO) buffer 210, also referred to herein as baseband buffer 210, within BBIC 133.

In one embodiment, TAS re-sampler 224 generates a second timing strobe (e.g., second timing strobe 330 in FIGS. 3A and 3B) which TAS re-sampler 224 forwards as re-sampler output signal 230 to RFIC 132 over the digital RF interface. In another embodiment, illustrated in FIG. 3B, TAS re-sampler 224 propagates the first timing strobe (i.e., TAS trigger 220) to the output port of TAS re-sampler 224 as re-sampler output signal 230. As a result, TAS re-sampler 224 yields re-sampler output signal 230 which is one of (a) a synchronized re-sampled signal (e.g., second timing strobe 330), and (b) the first timing strobe (e.g., TAS trigger 220), which is not resampled by TAS re-sampler 224. TAS re-sampler 224 provides re-sampler output signal 230 to RFIC 132. In addition, TAS re-sampler 224 generates a receive enable signal illustrated as RXIQ Enable 226 which TAS re-sampler 224 sends to baseband buffer 210 to enable and trigger the reading of RXIQ data from baseband buffer 210.

Receiver 200 is configured to re-establish synchronization in response to at least one of (i) switching from a first receive mode to a second receive mode, (ii) restarting a baseband modem clock to communicate data following a sleep mode period and (iii) initiation of a power on procedure of wireless communication device 100. For example, wireless communication device 100 can enter a compression mode in advance of switching from one mode to another. The compression or compressed mode is a radio path feature that enables wireless communication device 100 to maintain the current connection on a certain frequency while performing measurements on another frequency. This allows wireless communication device 100 to monitor neighboring cells on another frequency or radio access technology (RAT) such as GSM. Compressed mode means that transmission and reception are halted for a short time, such as a few milliseconds in order to perform a measurement on another frequency or RAT. As previously described, receiver 200 includes an asynchronous digital radio frequency (RF) interface comprising first asynchronous digital RF interface component (206) on RFIC 132 and second asynchronous digital RF interface component (208) on BBIC 133. Receiver 200 is configured to (a) maintain synchronization of data transmission between RFIC 132 and BBIC 133 and/or (b) re-establish synchronization after transmission and/or reception is temporarily halted. Thus, receiver 200 performs a number of operations and/or functions in order to provide and/or re-establish synchronization for receive data being transmitted over the asynchronous digital radio frequency (RF) interface.

In order to maintain and/or re-establish synchronization, BBIC 133 triggers baseband modem 216 to generate, using L1 timer 218, TAS trigger 220, which represents a first timing strobe. TAS trigger 220 is synchronized to a baseband modem clock. For example, the baseband modem clock operates at 1.2288 MHz for a code division multiple access (CDMA) mode. In one embodiment, TAS re-sampler 224 generates, using first timing strobe 220, a second timing strobe (i.e., second timing strobe 330 of FIGS. 3A and 3B) synchronized to a radio frequency integrated circuit (RFIC) clock. For example, the RFIC clock can operate at 1.92 MHz to support both LTE and CDMA modes. TAS re-sampler 224 forwards the second timing strobe to RFIC 132 and initiates a clock cycle counter (e.g., counter 316 illustrated in FIG. 3) to track RFIC clock cycles. In addition, TAS re-sampler 224 triggers, using re-sampler output signal 230, RFIC 132 to perform data sampling to collect receive data samples. RFIC 132 sends the collected receive samples to baseband buffer 210 over the digital RF interface 206, 208. The receive data samples are received by baseband buffer 210 as digital bursts of RXIQ data 204. In response to clock cycle counter 316 reaching a pre-determined number of RFIC clock cycles corresponding to a first fixed delay, TAS re-sampler 224 sends a receive enable signal (e.g., RXIQ Enable 226) to baseband buffer 210 to enable and trigger a reading of data from baseband buffer 210 using the RFIC clock. As a result, TAS re-sampler 224 effectively substitutes a pre-determined fixed latency value in place of a variable latency value corresponding to a transmission of various receive data samples over an asynchronous digital RF interface. Multi-rate finite impulse response filter (FIR) 214 receives the data from baseband buffer 210 and, following a second fixed delay associated with data filtering at multi-rate FIR 214, baseband modem 216 receives corresponding data at the baseband modem clock rate. TAS re-sampler 224 is described and illustrated in greater detail in FIGS. 3A and 3B.

Those of ordinary skill in the art will appreciate that the hardware components and basic configurations depicted in FIGS. 1 and 2 may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

FIG. 3A is a block diagram illustrating a timing accurate strobe (TAS) re-sampler circuit, according to one embodiment. TAS re-sampler 224A comprises pulse extender 306 and synchronization module 310, which is coupled to an output of pulse extender 306. In addition, TAS re-sampler 224A comprises counter 316, which is coupled to an output port of synchronization module 310.

Pulse extender 306 receives a first clock signal 312 (e.g., the baseband modem clock) at a second input port. Pulse extender 306 yields pulse extended TAS signal 308, which signal is received at a first input port of synchronization module 310. Synchronization module 310 also receives second clock signal 314 (e.g., the RFIC clock signal) at a second input port. Synchronization module 310 provides second timing strobe 330 to a first input port of counter 316. Counter 316 also receives second clock signal 314 at a second input port. Counter 316 provides RXIQ Enable signal 226 to RXIQ FIFO 210 (FIG. 2). In addition, synchronization module 310 provides second timing strobe 330 to RFIC 132 (FIGS. 1 and 2) to trigger RF data sampling. Within this embodiment, second timing strobe 330 is re-sampler output signal 230 of FIG. 2.

In one embodiment, BBIC 133 determines whether timing synchronization is required for receive data by determining whether: (a) a switch in communication mode is being initiated and/or (b) a resumption of communication is being initiated. In response to determining that timing synchronization is required, BBIC 133 triggers L1 timer 218 to send TAS trigger signal 220 to TAS re-sampler 224 and, in particular, to pulse extender 306. If the baseband clock frequency is a same clock frequency as the RFIC clock frequency, pulse extender 306 propagates TAS trigger 220 as TAS signal 308 to synchronization module 310 without extending a pulse width of TAS trigger 220, in one embodiment. Synchronization module 310 generates the second timing strobe 330 in response to receipt of one of the first timing strobe and the pulse extended timing strobe. Synchronization module 310 generates the second timing strobe 330 synchronized to the RFIC sampling clock frequency. Synchronization module 310 provides second timing strobe 330 to counter 316.

If timing synchronization is required and the baseband modem clock frequency is different from the RFIC clock frequency, pulse extender 306 extends a pulse width of the first timing strobe to provide an extended timing strobe (illustrated as pulse extended TAS signal 308). Specifically, in response to receiving TAS trigger signal 220 to initiate re-sampling, pulse extender 306 extends a pulse width of the first timing strobe to enable detection of the first timing strobe via the RFIC clock. In one embodiment, BBIC 133 provides information about the mathematical relationship between the baseband modem clock frequency and the RFIC clock frequency to pulse extender 306, and pulse extender 306 extends the pulse width of the first timing strobe based upon a mathematical relationship between the baseband modem clock frequency and the RFIC clock frequency. In a related embodiment, BBIC 133 provides information about the mathematical relationship based on characteristics of first clock signal 312. Pulse extender 306 forwards pulse extended TAS signal 308 to synchronization module 310 which generates second timing strobe 330 synchronized to the RFIC sampling clock frequency, using extended TAS signal 308. In one embodiment, synchronization module 310 generates the second timing strobe in response to detection of receipt of the first timing strobe at the signal input of synchronization module 310.

In response to receiving second timing strobe 330, counter 316 initiates a count of RFIC clock cycles. When the counter 316 reaches a pre-established and/or pre-determined counter value 134 (FIG. 1), which is a number of RFIC clock cycles, counter 316 transmits receive enable signal 226 to baseband buffer 210 to enable and trigger a reading of data from baseband buffer 210 using the RFIC clock. TAS utility 136 pre-determines a counter value and/or uses a pre-determined counter value for a fixed number of RFIC clock cycles used to provide a fixed latency between generation, at the baseband modem, of the second timing strobe and reading of receive data from baseband buffer 210. Pre-determined counter value 134 (FIG. 1) is associated with a preset high probability that receive data is present in baseband buffer 210, without baseband buffer 210 overflowing. An overall fixed latency can be described with reference to timing references provided by FIG. 4. According to one aspect of the disclosure, TAS re-sampler 224A establishes, using pre-determined counter value 134, the overall fixed latency that occurs between generation, at baseband modem 216, of the first timing strobe at time t=T (e.g., T1 of FIG. 4) and initiation of receipt of specific baseband data at time t=T+K2 (e.g., T6 of FIG. 4) at baseband modem 216. The specific baseband data corresponds to RF data present at an RF antenna at time t=T+K1 when second timing strobe 330 was generated. K1 and K2 are time constants.

As previously described, TAS re-sampler 224 re-samples a first timing strobe that is synchronized to the baseband modem clock to generate a second timing strobe that is synchronized to the RFIC clock. However, when the baseband modem clock frequency is different from the RFIC sample clock frequency, pulse extender 306 extends a pulse width of the first timing strobe to provide a pulse extended TAS signal. Synchronization module 310 uses the pulse extended signal to generate a second timing strobe that is synchronized to the RFIC sample clock. When the baseband modem clock frequency is the same as the RFIC sample clock frequency, pulse extender 306 does not extend the pulse width and provides the first timing strobe to synchronization module 310. Thus, for instances where the clock frequencies are the same, synchronization module 310 receives the first timing strobe as an input signal. Synchronization module 310 re-samples the received input signal to provide a re-sampled signal that is synchronized to the RFIC clock. The propagation path through pulse extender 306 and synchronization module 310 includes inherent propagation delay when generating the second timing strobe 330, regardless of whether the clock frequencies are the same or are different.

Figure 3B:
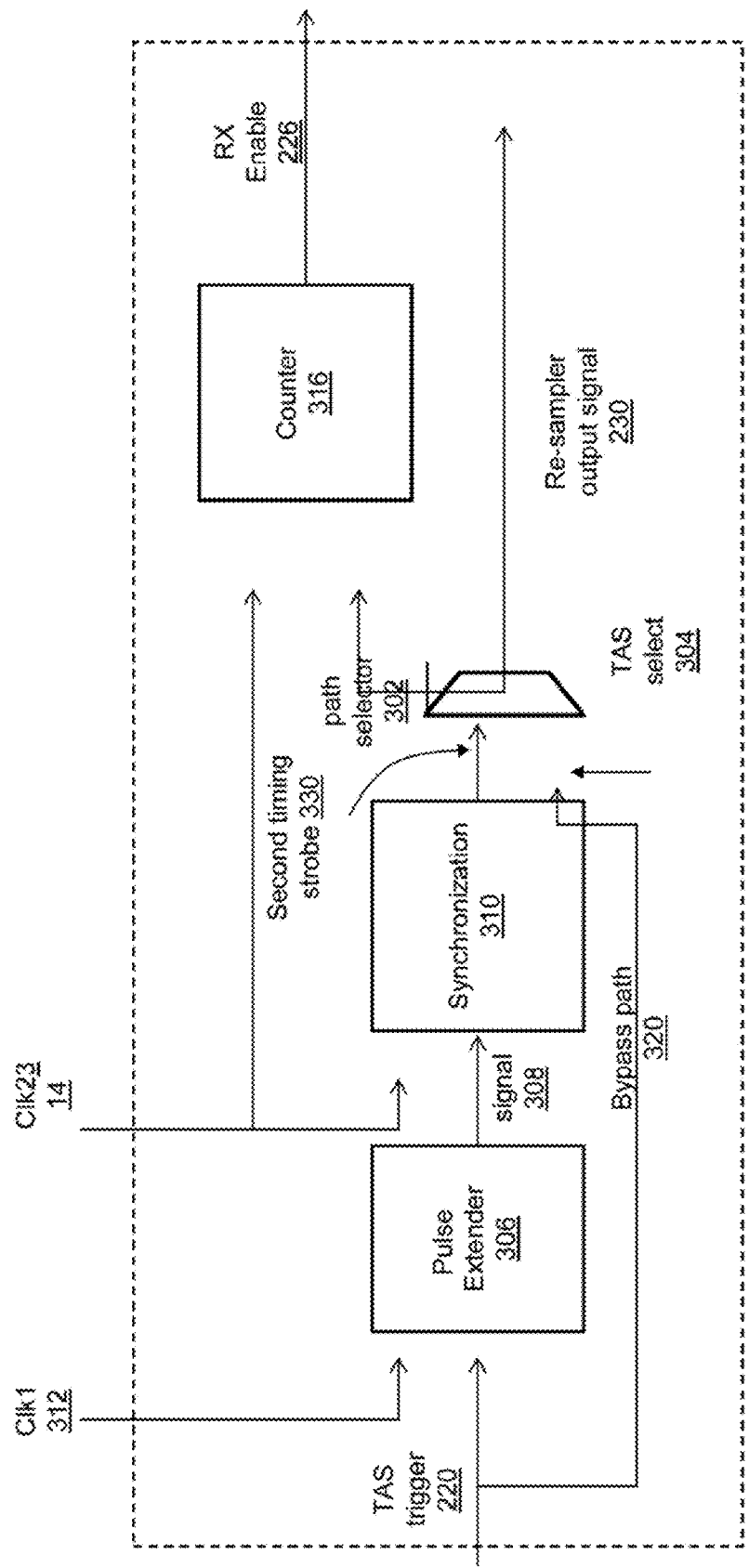
FIG. 3B is a block diagram illustrating another embodiment of a timing accurate strobe (TAS) re-sampler circuit, according to one embodiment.

FIG. 3B is another block diagram illustrating a timing accurate strobe (TAS) re-sampler circuit, according to an alternate embodiment. Similar to the configuration of FIG. 3A, TAS re-sampler 224B comprises pulse extender 306, synchronization module 310 coupled to an output of pulse extender 306, and counter 316 within a first signal propagation path. However, unlike TAS re-sampler 224A of FIG. 3A, TAS re-sampler 224B of FIG. 3B also includes a synchronization bypass path 320 as well as a path selector 302. Path selector 302 is essentially a multiplexer (MUX) and has two input ports, a single output port, and a select signal, TAS select 304. TAS trigger signal 220 is received at the input port of pulse extender 306, and the output of pulse extender 306 is passed to synchronization module 310. The output signal from synchronization module 310 is a synchronized re-sampled signal, second timing strobe 330, which is coupled to a first input port of path selector 302. As shown, TAS trigger signal 220 is also provided at the second input port of path selector 302, via synchronization bypass path 320. Synchronization bypass path 320 enables TAS trigger signal 220 to avoid pulse extender 306 and/or synchronization module 310, and to be available for selection at the second input port of path selector 302 without undergoing signal modification and/or without incurring the delay that occurs along a first signal propagation path. By providing a bypass path around pulse extender 306 and synchronization module 310, TAS re-sampler 224B enables TAS trigger signal 220 to avoid the delay inherent when a signal propagates through the pulse extender 306 and synchronization module 310 to generate second timing strobe 330.

Counter 316 is coupled to the output port or the output signal line of path selector 302. TAS select signal 304 is received by path selector 302 from BBIC 133 and selects one of: (a) a delayed re-sampled signal (i.e., second timing strobe 330) that is synchronized to an RFIC clock; and (b) the first timing strobe (i.e., TAS trigger signal 220), which is synchronized to the baseband modem clock and which is not re-sampled or delayed. According to one aspect of the embodiment involving use of TAS re-sampler 224B, BBIC 133 includes logic that determines which of two values to assign to TAS select 304, from a first value (e.g., a logic 0 or OFF signal) that causes path selector 302 to select the delayed re-sampled signal at the first input port and a second value (e.g., a logic 1 or ON signal) that causes path selector 302 to select the original (i.e., not sampled or delayed) TAS trigger signal 220 at the second input port. The selected input signal is then propagated to the output of path selector 302, which is also forwarded to counter 316.

In one embodiment, BBIC 133 provides TAS select signal 304 as an "ON" signal (i.e., a logic 1) to enable propagation of TAS trigger signal 220 (i.e., the first timing strobe) via the output port of path selector 302. Alternatively, BBIC 133 provides TAS select signal 304 as an "OFF" signal (i.e., a logic 0) to enable propagation of the time-delayed re-sampled signal, second timing strobe 330, via the output port of path selector 302. When BBIC 133 provides an "OFF" signal as TAS select signal 304 to path selector 302, indicating that a re-sampled signal is desired or required to provide synchronization for receive data, path selector 302 connects second timing strobe 330 received at the first input port to the output port of path selector 302. Thus, path selector 302 provides second timing strobe 330 to counter 316 and RFIC 132 (FIGS. 1 and 2). When BBIC 133 provides an "ON" signal as TAS select signal 304 to path selector 302, indicating that TAS trigger signal 220, instead of a re-sampled signal, can be utilized to provide synchronization for transmission of receive data over an asynchronous interface, path selector 302 connects TAS trigger signal 220 received at the second input to the output port of path selector 302. Accordingly, path selector 302 provides TAS trigger signal 220 to counter 316 and RFIC 132. In this latter case, TAS trigger signal 220, the first timing strobe, is received by RFIC 132 as a signal that is not re-sampled and without the propagation delay inherent with generation of second timing strobe 330 when BBIC 133 provides an "OFF" signal as TAS select signal 304.

In one embodiment, TAS select signal 304 is provided as an ON signal to enable path selector 302 to propagate the signal associated with a smaller delay (i.e., TAS trigger signal 220). In one embodiment, BBIC 133 sets the "OFF" signal as the default setting for TAS select signal 304. In one implementation, this automatic (default) selection can occur without requiring transmission of a select signal, as the TAS select signal 304 can be a null or zero (0) signal unless specifically changed by BBIC logic triggering a generation of a logic high (1) pulse on the TAS select signal line. It is appreciated that, in an alternate embodiment, path selector 302 can be configured to select the first input in response to the ON signal and the second input in response to the OFF signal. Similarly to the operation of TAS re-sampler 224A, in response to receipt of re-sampler output signal 230, counter 316 begins to count RFIC clock cycles. After a pre-determined number of RFIC clock cycles, counter 316 provides RXIQ Enable signal 226 to RXIQ FIFO 210 (FIG. 2) to trigger a reading of data from RXIQ FIFO 210. Upon receipt of re-sampler output signal 230, RFIC 132 begins RFIC data sampling.

FIG. 4 is a timing diagram illustrating a time progression of signals used to provide synchronization for sampled data being transmitted over an asynchronous digital RF interface, according to one embodiment. Timing diagram 400 illustrates a number of time instants "1", "2", "3", "4", "5" and "6" illustrated as circled number references, which collectively define a horizontal time axis (not specifically shown). In addition, timing diagram 400 illustrates a number of information signals including DigRF TAS 402 and L1 TAS trigger 415 and clock signals including RFIC clock signal 406 and baseband modem clock signal 412. L1 TAS trigger 415 (i.e., the first timing strobe) illustrated at time instant "1" (T1) is synchronized with baseband modem clock signal 412. DigRF TAS 402 (e.g., second timing strobe 330) is illustrated at T2 (i.e., time instant "2") corresponding to RFIC clock signal 406. Also illustrated in timing diagram 400 is Digital RF RX data burst signal 404. Timing diagram 400 also comprises RXIQ Enable signal 410. "RXIQ re-sample Cnt" signal 408 is also illustrated in timing diagram 400. Also illustrated in timing diagram 400 is "IQ flow into multi-rate FIR" signal 414 and "IQ flow into baseband modem" signal 416.

At T1, L1 timer 218 generates L1 TAS trigger 415 in synchronization with baseband modem clock signal. At T2, TAS re-sampler 224 then generates Dig RF TAS 402 in synchronization with RFIC clock signal 406. As a result, a clock pulse of RFIC clock signal 406 coincides with a pulse of DigRF TAS 402 occurring at T2. Dig RF TAS 402 corresponds to second timing strobe 330 (FIG. 3A) that is received by RFIC 132 from TAS re-sampler 224 via Digital RF interfaces 206 and 208. Initiation of RF data sampling at an antenna begins after a delay (e.g., delay 418) that follows the occurrence of the pulse of DigRF TAS 402 at T2. At T3, counter 316 begins counting RFIC clock signals, and the count of RFIC clock cycles correspond to the number of pulses indicated by "RXIQ re-sample Cnt" signal 408. In addition, variable propagation/transmission latency 420 is illustrated as a time interval between RF sampling at the antenna and receipt of corresponding data provided at an initiation of Digital RF RX data burst signal 404 at RXIQ FIFO 210. T2 and T3 represent substantially a same time instant on a time axis common to all waveforms and/or signals illustrated in timing diagram 400. At T4, following fixed latency 422 established by counter 316 using the pre-established counter value, counter 316 generates RX IQ enable signal 410. Counter 316 sends RX IQ enable signal 410 to RXIQ FIFO 210 to trigger the reading of data, at T5, from RXIQ FIFO 210 into multi-rate FIR 214 at the RFIC clock rate. Multi-rate FIR 214 receives data read from RXIQ FIFO 210 as "IQ flow into multi-rate FIR" signal 414. At T6, following constant multi-rate FIR delay 424 associated with data filtering at multi-rate FIR 214, baseband modem 216 receives baseband modem IQ input data signal illustrated as "IQ flow into baseband modem" signal 416 at the baseband modem clock rate. As illustrated, TAS re-sampler 224A provides an overall fixed delay 426 from the generation of the first timing strobe to initiation of receipt at baseband modem 216 of specific receive data. The specific receive data is baseband data corresponding to RF data present at the RF antenna when the first timing strobe is generated. Furthermore, the RF data represents data that is previously sampled using second timing strobe 330.

Figure 5:
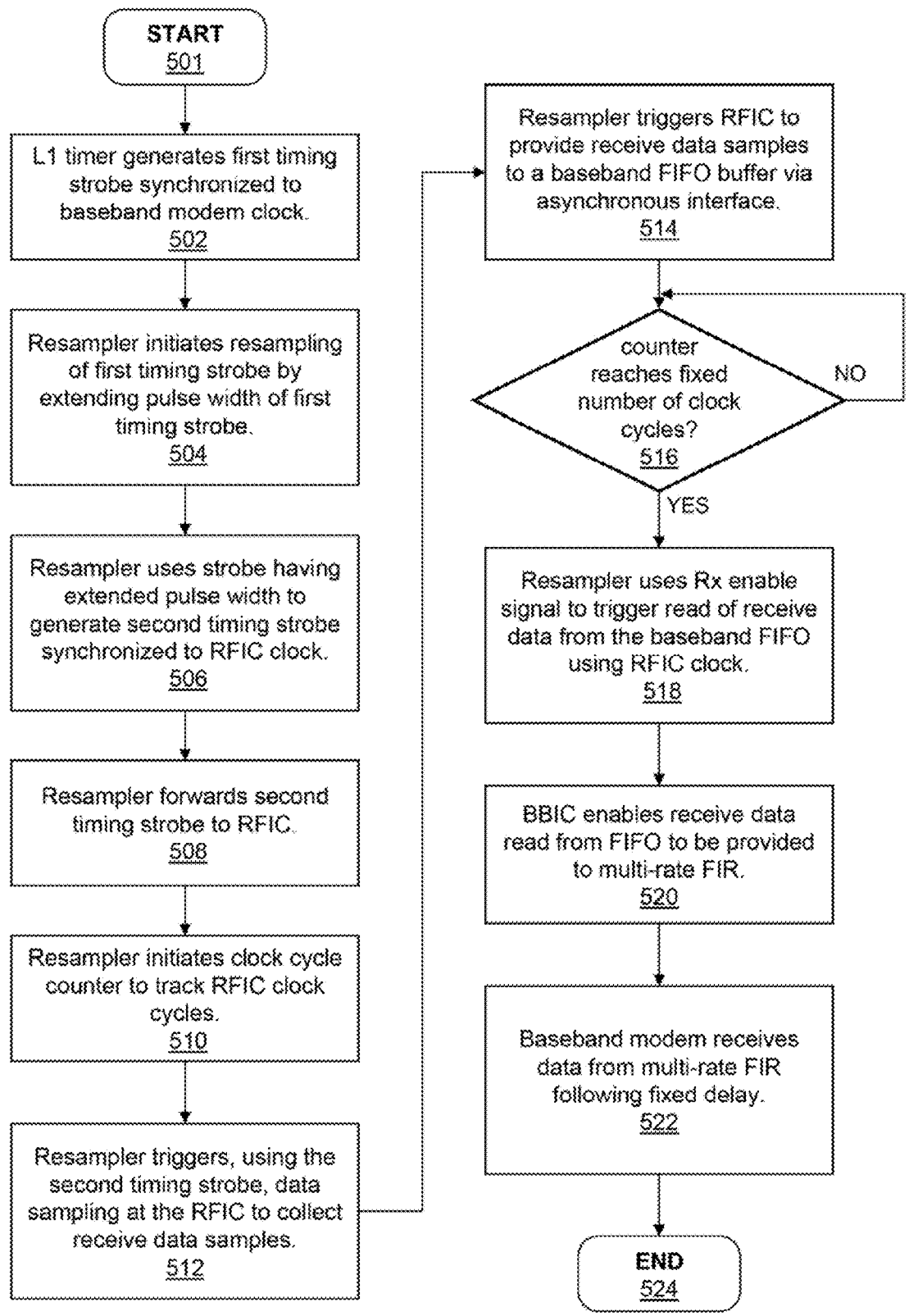
FIG. 5 is a flow chart illustrating one embodiment of a method for providing synchronization for receive data being transmitted over an asynchronous digital radio frequency (RF) interface in a wireless communication device, according to one embodiment.

FIG. 5 is a flow chart illustrating one embodiment of the method by which the above processes of the illustrative embodiments can be implemented. Specifically, FIG. 5 illustrates one embodiment of a method for providing synchronization for receive data being transmitted over an asynchronous digital radio frequency (RF) interface in a wireless communication device, according to one embodiment. Although the method illustrated by FIG. 5 may be described with reference to components and functionality illustrated by and described in reference to FIGS. 1-4, it should be understood that this is merely for convenience and alternative components and/or configurations thereof can be employed when implementing the method. Certain portions of the method may be completed by TAS utility 136 executing on one or more processors (processor 105 or DSP 128) within wireless communication device 100 (FIG. 1), or local processor 138 or controller of BBIC 133 (FIG. 1, 2 or 3), or a processing unit or controller on receiver IC 200. The executed processes then control specific operations of, or on, BBIC 133. For simplicity in describing the methods, all method processes are described from the perspective of BBIC 133 and specifically TAS re-sampler 224.

The method of FIG. 5 begins at initiator block 501 and proceeds to block 502 at which a clock generator and/or timer (e.g., an L1 timer) associated with baseband modem 216 generates a first timing strobe synchronized to a baseband modem clock. At block 504, TAS re-sampler 224 initiates re-sampling of the first timing strobe by extending the pulse width of first timing strobe to enable detection via an RFIC clock. At block 506, TAS re-sampler 224 uses the strobe having extended pulse width to generate second timing strobe synchronized to the RFIC clock. At block 508, TAS re-sampler 224 forwards the second timing strobe to the RFIC. At block 510, TAS re-sampler 224 initiates clock cycle counter 316 to track RFIC clock cycles. At block 512, TAS re-sampler 224 triggers, using the second timing strobe, data sampling at RFIC 132 to collect receive data samples. In addition, at block 514, TAS re-sampler 224 triggers RFIC 132 to provide receive data samples to baseband FIFO buffer 210 via the asynchronous RF interface.

At decision block 516, TAS re-sampler 224 determines whether clock cycle counter 316 has reached/counted a pre-determined number of RFIC clock cycles corresponding to a first fixed delay. If, at decision block 516, TAS re-sampler 224 determines that the clock cycle counter has reached the pre-determined number of RFIC clock cycles, TAS re-sampler 224 sends receive enable signal 226 to baseband FIFO buffer 210 to enable and trigger a reading of data from FIFO buffer 210 using the RFIC clock, as shown at block 518. However, if at decision block 516, TAS re-sampler 224 determines that clock cycle counter 316 has not yet reached or counted the pre-determined number of RFIC clock cycles, the process iterates at decision block 516. At block 520, multi-rate finite impulse response filter (FIR) 214 receives the data from FIFO buffer 210. Following a second fixed delay associated with data filtering at multi-rate FIR 214, baseband modem 216 receives specific data at the baseband modem clock rate, at block 522. The receipt of specific data by baseband modem 216 is initiated by the receipt of specific baseband data corresponding to RF data present at the RF antenna when the first timing strobe is generated. The process ends at block 524.

The flowcharts and block diagrams in the various figures presented and described herein illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the disclosure. Changes may be made with regards to the sequence of processes without departing from the spirit or scope of the present disclosure. Use of a particular sequence is therefore, not to be taken in a limiting sense, and the scope of the present disclosure extends to the appended claims and equivalents thereof.

In some implementations, certain processes of the methods are combined, performed simultaneously or in a different order, or perhaps omitted, without deviating from the spirit and scope of the disclosure. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method of synchronizing receive data across radio frequency (RF) components and baseband components within a wireless communication device, the method comprising:
    generating a first timing strobe synchronized with a baseband modem clock;
    generating, using the first timing strobe, a second timing strobe synchronized with an RFIC sample clock;
    forwarding the second timing strobe to the RFIC;
    initiating a time delay counter to track RFIC clock cycles;
    triggering, using the second timing strobe, data sampling at the RFIC to collect receive data samples, wherein said receive data samples are provided to a baseband First In First Out (FIFO) buffer;
    in response to the time delay counter reaching a pre-determined fixed number of RFIC clock cycles, reading receive data from the baseband FIFO buffer using the RFIC clock; and
    receiving data at the baseband modem.

2. The method of claim 1, wherein said generating the second timing strobe further comprises:
    extending a pulse width of the first timing strobe to provide an extended timing strobe that enables detection of the first timing strobe;
    wherein the pulse width of the first timing strobe is extended based on a mathematical relationship between the baseband modem clock frequency and the RFIC clock frequency; and
    generating the second timing strobe synchronized to the RFIC sampling clock frequency in response to detection of the first timing strobe.

3. The method of claim 1, wherein said generating the second timing strobe further comprises:
    determining that said baseband modem clock frequency and said RFIC sample clock frequency are substantially a same frequency; and
    in response to the baseband clock frequency being a same clock frequency as the RFIC clock frequency, generating the second timing strobe utilizing said first timing strobe that is synchronized to the baseband modem clock frequency, wherein said second timing strobe is synchronized to the RFIC sample clock frequency and is a re-sampled, synchronized version of the first timing strobe.

4. The method of claim 1, wherein said reading further comprises:
    providing a receive enable signal to trigger reading of receive data from the FIFO when the time delay counter reaches the pre-determined fixed number of RFIC clock cycles;
    forwarding the receive data that is read from the FIFO to one of a fixed delay multi-rate filter and the baseband modem; and
    filtering, using a fixed delay multi-rate filter associated with the baseband modem, the receive data to provide to the baseband modem filtered receive data using a data rate synchronized with the baseband modem clock.

5. The method of claim 1, wherein said generating the second timing strobe further comprises:
    determining whether a baseband modem clock frequency is different from an RFIC clock frequency;
    in response to the baseband modem clock frequency being different from the RFIC clock frequency: (a) re-sampling the first timing strobe to an RFIC sample clock domain to generate the second timing strobe; and (b) triggering an initiation of the timing delay counter; and
    in response to the baseband clock frequency being a same clock frequency as the RFIC clock frequency, (a) providing the first timing strobe as a re-sampler output signal to the RFIC to trigger data sampling, wherein the first timing strobe is not re-sampled, and (b) triggering an initiation of the timing delay counter.

6. The method of claim 1, wherein said reading further comprises:
- pre-determining a counter value for a fixed number of RFIC clock cycles used to provide a fixed latency between generation, at the baseband modem, of the second timing strobe and reading of receive data from the FIFO;
- wherein the pre-determined counter value is associated with a preset high probability that receive data is present in the FIFO, without the FIFO overflowing; and
- wherein the fixed latency occurs between generation of the second timing strobe and reading, from the FIFO, receive data corresponding to an RF sample that is present at the RF antenna when the second timing strobe is generated; and
- initiating, using the pre-determined counter value, establishment of an overall fixed latency that occurs between generation, at the baseband modem, of the first timing strobe and receipt, at the baseband modem, baseband data corresponding to an RF sample that is present at the RF antenna when the first timing strobe is generated.

7. The method of claim 1, further comprising:
- substituting a pre-determined fixed latency in place of each of a plurality of variable latency values associated with transmission of receive data over an asynchronous digital RF interface.

8. The method of claim 1, wherein said generating the first timing strobe and said generating the second timing strobe are initiated in response to at least one of: (i) switching from a first receive mode to a second receive mode, (ii) restarting a baseband modem clock to communicate data following a sleep mode period and (iii) initiation of a power on procedure.

9. A baseband integrated circuit (BBIC) comprising:
- a baseband modem clock that operates at a baseband modem clock frequency;
- a timer module that utilizes the baseband modem clock to generate a first timing strobe that is synchronized with the baseband modem clock;
- a timing strobe re-sampler having a counter, wherein the timing strobe re-sampler is coupled to the timer module and the timing strobe re-sampler: generates, using the first timing strobe, a second timing strobe that is synchronized with an RFIC sample clock having an RFIC sample clock frequency; forwards the second timing strobe to the RFIC; and triggers, using the second timing strobe, data sampling at the RFIC to collect receive data samples, wherein said receive data samples are provided to a baseband First In First Out (FIFO) buffer;
- wherein the counter: initiates a count of RFIC clock cycles; and in response to the count of RFIC clock cycles reaching a pre-determined fixed number of RFIC clock cycles, triggers a reading of receive data from the baseband FIFO buffer using the RFIC clock;
- a baseband modem that receives data using the baseband modem clock; and
- wherein the baseband modem clock frequency and the RFIC sample clock frequency are one of: (a) a substantially identical frequency; and (b) a different frequency.

10. The BBIC of claim 9, wherein the timing strobe re-sampler further comprises:
- a pulse extender that: extends a pulse width of the first timing strobe to provide an extended timing strobe that enables detection of the first timing strobe, wherein the pulse width of the first timing strobe is extended based upon a mathematical relationship between the baseband modem clock frequency and the RFIC clock frequency; and
- a synchronization module that: receives, from the pulse extender, one of the first timing strobe and the extended timing strobe; and generates the second timing strobe synchronized to the RFIC sampling clock frequency in response to detection of the first timing strobe.

11. The BBIC of claim 9, wherein the BBIC further comprises:
- a fixed delay multi-rate finite impulse response (FIR) filter that obtains receive data from the FIFO, and filters the receive data to provide to the baseband modem filtered receive data using a data rate synchronized with the baseband modem clock;
- wherein the counter provides a receive enable signal to trigger reading of receive data from the FIFO when the count of RFIC clock cycles reaches the pre-determined fixed number of RFIC clock cycles.

12. The BBIC of claim 9, wherein the timing strobe re-sampler:
- initiates generation of the second timing strobe in response to at least one of (i) switching from a first receive mode to a second receive mode, (ii) restarting a baseband modem clock to communicate data following a sleep mode period and (iii) initiating a power on procedure;
- determines whether the baseband modem clock frequency is different from the RFIC clock frequency;
- in response to the baseband modem clock frequency being different from the RFIC clock frequency: (a) re-samples the first timing strobe to the RFIC sample clock domain to generate the second timing strobe; and (b) triggers an initiation of the timing delay counter; and
- in response to the baseband clock frequency being a same clock frequency as the RFIC clock frequency, (a) provides the first timing strobe as a re-sampler output signal to the RFIC to trigger data sampling, wherein the first timing strobe is not re-sampled; and (b) triggers an initiation of the timing delay counter.

13. The BBIC of claim 9, wherein the timing strobe re-sampler:
- pre-determines a counter value for a fixed number of RFIC clock cycles associated with a preset high probability that receive data is present in the FIFO, without the FIFO overflowing;
- provides, utilizing the pre-determined counter value, a fixed latency between generation of the second timing strobe and reading of receive data from the FIFO;
- wherein the fixed latency occurs between generation of the second timing strobe and reading, from the FIFO, receive data corresponding to an RF sample that is present at the RF antenna when the second timing strobe is generated;
- establishes, using the pre-determined counter value, an overall fixed latency that occurs between generation, at the baseband modem, of the first timing strobe and receipt, at the baseband modem, baseband data corresponding to an RF sample that is present at the RF antenna when the first timing strobe is generated; and
- substitutes the pre-determined fixed latency in place of each of a plurality of variable latency values associated with transmission of receive data over an asynchronous digital RF interface.

14. The BBIC of claim 9, wherein the timing strobe re-sampler further comprises:
- a path selector having at least two data input ports, a control signal input port and an output port, wherein the at least two data input ports include a first input port that receives the second timing strobe from the synchronization module;

a synchronization bypass path that provides the first timing strobe to a second input port of the path selector;

wherein the path selector comprises a control signal port that receives a select signal used to selectively connect one of the first timing strobe and the second timing strobe to the output port of the path selector; and wherein the BBIC provides the select signal to the path selector as one of: (a) an OFF signal provided by a logical 0 to propagate the second timing strobe to the RFIC; and (b) an ON signal provided by a logical 1 to propagate the first timing strobe to the RFIC.

15. A wireless communication device comprising:
a radio frequency integrated circuit (RFIC);
a baseband integrated circuit (BBIC) connected by a digital RF interface to the RFIC and comprising:
   a baseband modem clock that operates at a baseband modem clock frequency;
   a timer module that utilizes the baseband modem clock to generate a first timing strobe that is synchronized with the baseband modem clock; and
   a timing strobe re-sampler having a counter, wherein the timing strobe re-sampler is coupled to the timing module and which: generates, using the first timing strobe, a second timing strobe that is synchronized with an RFIC sample clock having an RFIC sample clock frequency; forwards the second timing strobe to the RFIC; and triggers, using the second timing strobe, data sampling at the RFIC to collect receive data samples, wherein said receive data samples are provided to a baseband First In First Out (FIFO) buffer;
   wherein the counter: initiates a count of RFIC clock cycles; and in response to the count of RFIC clock cycles reaching a pre-determined fixed number of RFIC clock cycles, triggers a reading of receive data from the baseband FIFO buffer using the RFIC clock; and
a baseband modem that receives data using the baseband modem clock;
wherein the baseband modem clock frequency and the RFIC sample clock frequency are one of: (a) a substantially identical frequency; and (b) a different frequency.

16. The wireless communication device of claim 15, wherein the timing strobe re-sampler further comprises:
   a pulse extender that: extends a pulse width of the first timing strobe to provide an extended timing strobe that enables detection of the first timing strobe, wherein the pulse width of the first timing strobe is extended based upon a mathematical relationship between the baseband modem clock frequency and the RFIC clock frequency; and
   a synchronization module that: receives, from the pulse extender, one of the first timing strobe and the extended timing strobe; and generates the second timing strobe synchronized to the RFIC sampling clock frequency in response to detection of the first timing strobe.

17. The wireless communication device of claim 15, wherein the BBIC further comprises:
   a fixed delay multi-rate finite impulse response (FIR) filter that obtains receive data from the FIFO, and filters the receive data to provide to the baseband modem filtered receive data using a data rate synchronized with the baseband modem clock; and
   wherein the counter provides a receive enable signal to trigger reading of receive data from the FIFO when the count of RFIC clock cycles reaches the pre-determined fixed number of RFIC clock cycles.

18. The wireless communication device of claim 15, wherein the timing strobe re-sampler:
   initiates generation of the second timing strobe in response to at least one of (i) switching from a first receive mode to a second receive mode, (ii) restarting a baseband modem clock to communicate data following a sleep mode period and (iii) initiating a power on procedure;
   determines whether the baseband modem clock frequency is different from the RFIC clock frequency;
   in response to the baseband modem clock frequency being different from the RFIC clock frequency: (a) re-samples the first timing strobe to the RFIC sample clock domain to generate the second timing strobe; and (b) triggers an initiation of the timing delay counter; and
   in response to the baseband clock frequency being a same clock frequency as the RFIC clock frequency, (a) provides the first timing strobe as a re-sampler output signal to the RFIC to trigger data sampling, wherein the first timing strobe is not re-sampled; and (b) triggers an initiation of the timing delay counter.

19. The wireless communication device of claim 15, wherein the timing strobe re-sampler:
   pre-determines a counter value for a fixed number of RFIC clock cycles associated with a preset high probability that receive data is present in the FIFO, without the FIFO overflowing;
   provides, utilizing the pre-determined counter value, a fixed latency between generation of the second timing strobe and reading of receive data from the FIFO;
   wherein the fixed latency occurs between generation of the second timing strobe and reading, from the FIFO, receive data corresponding to an RF sample that is present at the RF antenna when the second timing strobe is generated;
   establishes, using the pre-determined counter value, an overall fixed latency that occurs between generation, at the baseband modem, of the first timing strobe and receipt, at the baseband modem, baseband data corresponding to an RF sample that is present at the RF antenna when the first timing strobe is generated; and
   substitutes a pre-determined fixed latency for each of a plurality of variable latency values associated with transmission of receive data over the asynchronous digital RF interface.

20. The wireless communication device of claim 15, wherein the timing strobe re-sampler further comprises:
   a path selector having at least two data input ports, a control signal input port and an output port, wherein the at least two data input ports include a first input port that receives the second timing strobe from the synchronization module;
   a synchronization bypass path that provides the first timing strobe to a second input port of the path selector;
   wherein the path selector comprises a control signal port that receives a select signal used to selectively connect one of the first timing strobe and the second timing strobe to the output port of the path selector; and
   wherein the BBIC provides the select signal to the path selector as one of: (a) an OFF signal provided by a logical 0 to propagate the second timing strobe to the RFIC; and (b) an ON signal provided by a logical 1 to propagate the first timing strobe to the RFIC.

* * * * *